US006231715B1

(12) United States Patent
Schleinz et al.

(10) Patent No.: US 6,231,715 B1
(45) Date of Patent: May 15, 2001

(54) ELONGATE, SEMI-TONE PRINTING PROCESS

(75) Inventors: Robert Joseph Schleinz, Appleton, WI (US); Daniel James Conrad, Murfreesboro, TN (US); Joseph S. Kucherovsky, Philadelphia, PA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 08/359,481

(22) Filed: Dec. 20, 1994

(51) Int. Cl.[7] .......... B32B 31/00

(52) U.S. Cl. .......... 156/277; 156/160; 156/163; 156/196; 156/229

(58) Field of Search .......... 156/229, 196, 156/163, 160, 277; 428/195

(56) References Cited

U.S. PATENT DOCUMENTS

| | | | | |
|---|---|---|---|---|
| H1376 | | 11/1994 | Osborn, III et al. | 604/361 |
| 364,029 | | 5/1887 | Macnab | 101/179 |
| 429,891 | | 6/1890 | Crowell | 101/223 |
| 1,639,218 | | 8/1927 | Ebersol | 101/416.1 |
| 2,111,613 | * | 3/1938 | Bulford | 101/178 |
| 2,175,051 | | 10/1939 | Bromley | 101/178 |
| 2,378,444 | | 6/1945 | Smith et al. | 101/178 |
| 2,404,350 | | 7/1946 | Carlsen et al. | 101/423 |
| 2,504,021 | | 4/1950 | Heinrich | 101/180 |
| 2,743,206 | | 4/1956 | Verduin | 154/54.5 |
| 3,306,194 | | 2/1967 | Cutri | 101/131 |
| 3,306,196 | | 2/1967 | Cutri | 101/132.5 |
| 3,442,211 | | 5/1969 | Beacham | 101/416 |
| 3,518,940 | | 7/1970 | Stroud et al. | 101/223 |
| 3,978,789 | | 9/1976 | Fennekels et al. | 101/211 |
| 4,063,505 | | 12/1977 | Sasamoto et al. | 101/228 |
| 4,069,522 | | 1/1978 | Buell | 128/294 |
| 4,147,580 | | 4/1979 | Buell | 156/291 |
| 4,218,973 | | 8/1980 | Bouffard et al. | 101/181 |
| 4,232,076 | | 11/1980 | Stetson et al. | 428/158 |
| 4,249,532 | | 2/1981 | Polansky et al. | 128/287 |
| 4,281,598 | | 8/1981 | Rump | 101/470 |
| 4,340,212 | | 7/1982 | Simson | 270/5 |
| 4,496,647 | * | 1/1985 | Kawabe et al. | 430/303 |
| 4,501,072 | | 2/1985 | Jacobi, Jr. et al. | 34/1 |
| 4,581,657 | * | 4/1986 | Takauo | 358/285 |
| 4,720,415 | * | 1/1988 | Vander Wielen et al. | 428/152 |
| 4,824,503 | | 4/1989 | Wilen | 156/204 |
| 4,940,464 | * | 7/1990 | Van Gompel et al. | 604/396 |
| 4,965,122 | * | 10/1990 | Morman | 428/225 |
| 4,967,660 | | 11/1990 | Yamanari et al. | 101/229 |
| 4,980,705 | * | 12/1990 | Akutsu et al. | 345/155 |
| 4,981,747 | * | 1/1991 | Morman | 428/196 |
| 5,086,700 | | 2/1992 | Van Den Berg | 101/424.1 |
| 5,114,781 | * | 5/1992 | Morman | 428/198 |
| 5,116,662 | * | 5/1992 | Morman | 428/198 |
| 5,214,442 | | 5/1993 | Roller | 346/1.1 |
| 5,226,992 | | 7/1993 | Morman | 156/62.4 |
| 5,275,103 | | 1/1994 | Hahne | 101/488 |
| 5,320,891 | * | 6/1994 | Levy et al. | 428/108 |
| 5,336,545 | * | 8/1994 | Morman | 428/452 |
| 5,456,176 | | 10/1995 | Strasser | 101/219 |
| 5,463,249 | * | 10/1995 | Shinbo et al. | 257/690 |

FOREIGN PATENT DOCUMENTS

| | | | |
|---|---|---|---|
| 0 418 052 | 3/1991 | (EP) | G03F/5/00 |
| 0 495 285 | 7/1992 | (EP) | B41F/17/00 |
| 2 177 977 | 2/1987 | (GB) | A41B/13/02 |

OTHER PUBLICATIONS

U.S. Patent application Ser. No. 08/338,986.

* cited by examiner

*Primary Examiner*—Merrick Dixon
(74) *Attorney, Agent, or Firm*—Thomas M. Gage; Douglas L. Miller

(57) ABSTRACT

A printing process prints a continuously moving substrate with elongate, semi-tone graphics. The printed substrate is incorporated into a composite elastic material, in which the substrate is contracted, thereby forming a desired full-tone graphic from the semi-tone graphic.

10 Claims, 4 Drawing Sheets

ELONGATE, SEMI-TONE PRINTING PROCESS

BACKGROUND OF THE INVENTION

The present invention pertains to processes for printing substrates and substrates printed thereby, and more specifically to processes for printing elongate, semi-tone graphics on substrates, and substrates printed thereby.

The printing of substrates, such as woven and nonwoven fabrics and films, is well known. The printing of fabrics with inks and dyes is a common and widely used method for imparting patterns and colors to a basic fabric. Many current personal care products, such as diapers and training pants, include printed patterns on portions thereof to improve their appearance. These printed portions are generally non-elastic, which makes the printing of patterns thereon a straightforward and conventional printing exercise. However, significant problems arise when the substrate, or portions thereof, to be printed is elastic, or, after being printed, then will be elasticized.

One problem occurs when a high resolution and high definition printed pattern is desired on an elastic substrate. In this instance, the elastic substrate generally is fully extended to allow ink to be printed on the entire pattern field. This is necessary in order to eliminate unprinted void areas that occur when the elastic substrate is printed in its relaxed, contracted state. These unprinted void areas exist because the unelevated, or trough, portions of the relaxed, contracted elastic substrate do not come in direct and full contact with the printing apparatus. Consequently, the unelevated, or trough, portions are not fully, if at all, printed.

Unfortunately, in many cases the printing of elongated elastic substrates has proven to be cost prohibitive. This is due to having to use carrier sheets in some printing processes to prevent ink from striking through the extended, and thus thinner, elastic substrate. The carrier sheets are an added expense, as is their replacement when worn.

Another problem is the inability to keep a constant tension on an elastic substrate that is continuously moving at high speeds. The high speeds, and the physical handling of the elastic substrate at these high speeds, causes the tension on the elastic substrate to vary, which can produce patterns that are misregistered, blurred, and/or incorrect in their dimensions.

Yet another problem with printing elastic substrates occurs when the elastic substrate is elastic in the cross-direction, i.e., the direction transverse to the direction the substrate is continuously moving. The cause of this problem is an inability to extend or elongate the elastic substrate in the cross-direction during a continuous printing process.

An added problem occurs when the substrate to be printed is a low basis weight material. Because low basis weight substrates inherently include a large number of small voids, or a smaller number of larger voids, any ink or inks printed thereon can run through, i.e., strikethrough, the substrate. The problem with ink strikethrough is that the ink builds up on the printing apparatus. This ink buildup on the printing apparatus results in poor print quality on the substrate, the transfer of ink to the back of the substrate, and poor operating efficiency due to machinery down time required to remove the ink buildup.

This problem becomes even more significant in high speed printing environments, since ink buildup is accelerated, thereby increasing the number of times the machinery needs to be shut down for removal of the buildup.

As shutdown times increase, so do waste of material and ink that are associated with machinery startup.

SUMMARY OF THE INVENTION

In one form of the invention there is a process for providing a printed elasticized substrate including the steps of continuously moving a substrate having a printing surface, printing a semi-tone graphic on the printing surface of the substrate, elasticizing the substrate after it has been printed, and contracting the substrate to provide a full-tone graphic.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DESCRIPTION OF THE PREFERRED EMBODIMENT

The present invention provides an elongate, semi-tone printing process for printing substrates, which can be incorporated into various types of articles, such as, but not limited to, personal care products. These personal care products include, but are not limited to, diapers, feminine care products, adult incontinence products, and training pants, and it may be desirable to have one or more visible graphics, in one or more colors, printed on these products. With training pants, for example, it may be desirable to make the pant as attractive and fun as possible for the child to wear to encourage the child in his or her progress from diapers to training pants in the toilet training process.

One way to make these products, such as a training pant, more appealing is to print bright color graphics on them, such as on the outer visible surface.

The process of the present invention desirably utilizes flexographic printing to provide the proper balance of cost effectiveness, high speed, and high quality printing. Flexographic printing is particularly suitable for printing nonwoven fibrous webs, since the inherent tactile softness of the web is maintained by the application of a thin layer of a suitable ink. Examples of suitable inks are described in U.S. patent application Ser. No. 08/338,986 filed on Nov. 14, 1994, the contents of which are incorporated by reference herein.

Flexography is a printing technology which uses flexible raised rubber or photopolymer plates to deposit the ink or inks on a given substrate. The types of plates that can be used with the process of the present invention include plates identified as DuPont Cyrel® HL, PQS, HOS, PLS, and LP, which may be commercially obtained from E. I. DuPont de Nemours and Company, Inc., of Wilmington, Del.; a plate identified as BASF Nyloflex®, which may be commercially obtained from BASF of Clifton, N.J.; and a plate identified as Flex-light® type FL-SKOR®, which may be obtained from W. R. Grace and Company of Atlanta, Ga. Others include laser etched vulcanized rubber cylinders, such as those supplied by Luminite Products Corporation of Salamanca, N.Y., or by Flexo Express of Salamanca, N.Y.; or rubber printing plates, such as those supplied by Fulflex, Inc. of Middleton, R.I. The rubber printing plates and vulcanized rubber cylinders can be natural rubber, EPDM, nitrites, or urethanes.

Other printing systems that can be used with the present invention include rotogravure printing, which uses an engraved print roll, and ink jet printing, which uses an electrostatic charge to deflect droplets of ink.

Figure 1:
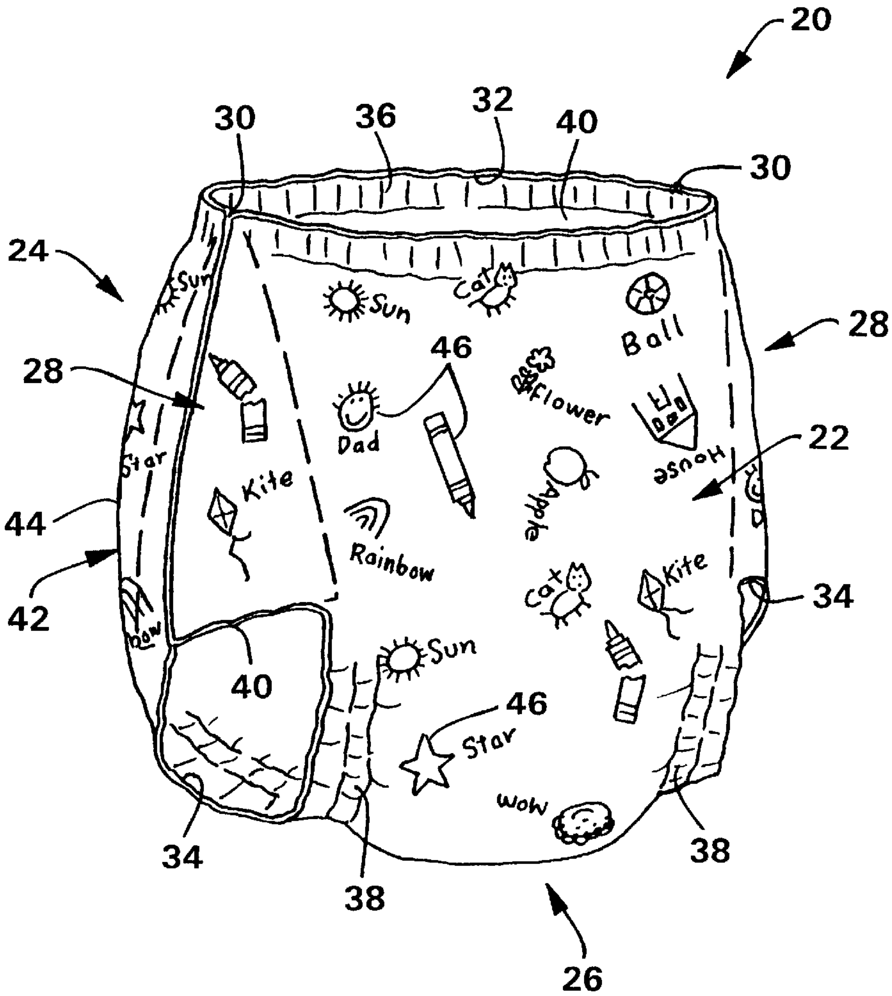
FIG. 1 illustrates a perspective view of one article incorporating the principles of the present invention.

Referring now to FIG. 1, there is illustrated a training pant 20 including a front section 22, a back section 24, a crotch section 26, and a pair of side sections 28. Each side section 28 includes a bonded seam 30 which may be formed in any suitable manner, such as by ultrasonic bonding, heat bonding, adhesive bonding, or the like. Training pant 20 defines a waist opening 32 and a pair of leg openings 34. In order to provide elasticity about waist opening 32, an elastic waistband 36 is incorporated into training pant 20 at waist opening 32 in any suitable manner well known in the art. Similarly, an elastic legband 38 is incorporated into training pant 20 at each leg opening 34 to provide elasticity thereto. The term "elasticity" refers to a material or composite elastic material that tends to recover its original size and shape after removal of the force causing the deformation, and is expressed as a percent.

Training pant 20 further includes a liquid permeable liner 40, an absorbent (not shown) at crotch section 26, and an outer cover 42. Outer cover 42 may or may not be liquid impermeable, and has an outer surface 44 with a plurality of printed graphics 46 thereon. The term "graphic" includes, but is not limited to, any type of design, image, mark, figure, codes, words, patterns, or the like. For a product such as training pant 20, graphics 46 will generally include objects associated with little boys and little girls, such as multi-color trucks, airplanes, balls, dolls, bows, or the like. Training pant 20 can be made in any suitable manner well known in the art. Some other examples of training pants and their construction are described in U.S. Pat. No. 4,940,464, the contents of which are incorporated by reference herein.

It is generally desired that training pant 20 also incorporate elastic characteristics other than those provided by elastic waistband 36 and elastic legbands 38. For example, both liner 40 and outer cover 42 can be made of elastic materials to provide elasticity throughout the pant body, as defined by training pant 20. In this particular embodiment of training pant 20, it will be understood that liner 40 is made of a suitable liquid permeable, elastic material, and that outer cover 42 is a three-layered composite elastic material. The term "composite elastic material" refers to a multi-layered material having at least one elastic substrate joined to at least one gatherable substrate at least at two locations, in which the gatherable substrate is gathered between the locations where it is joined to the elastic substrate. A composite elastic material may be elongated to the extent that the gatherable substrate between the bond locations permits the elastic substrate to elongate. This type of composite elastic material is disclosed, for example, by Vander Wielen et al., U.S. Pat. No. 4,720,415, the contents of which are incorporated by reference herein. Use of the term "substrate" includes, but is not limited to, woven or nonwoven webs, porous films, ink permeable films, paper, composite structures, or the like.

Figure 2:
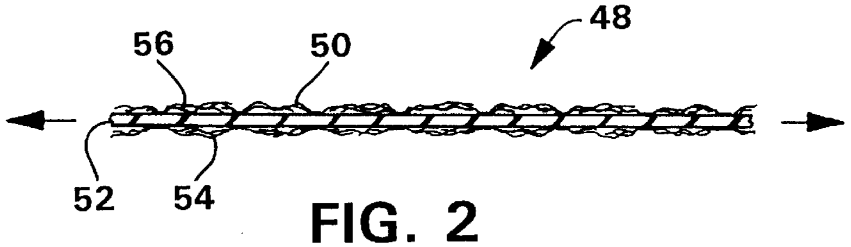
FIG. 2 illustrates a fragmentary, cross-sectional view of a composite elastic material in an elongated state.
Figure 3:
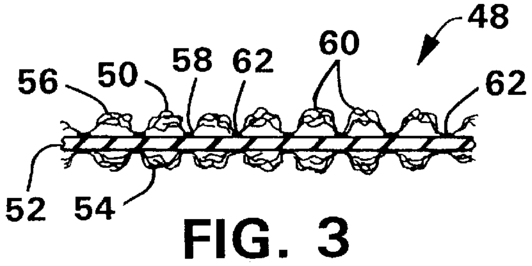
FIG. 3 illustrates the composite elastic material in FIG. 2 in a relaxed, contracted state.

Referring to FIGS. 1–3, outer cover 42 is a composite elastic material comprising two gatherable substrates and one elastic layer. With reference to FIG. 2, there is illustrated a composite elastic material in the form of an elasticized substrate 48. The term "elasticized" refers to a material, layer, or substrate that is naturally non-elastic, but which has been rendered elastic by, for example, suitably joining an elastic material, layer, or substrate thereto. In FIG. 2, elasticized substrate 48 is in an extended state, while in FIG. 3 it is in a relaxed, contracted state. In this described embodiment of training pant 20, outer cover 42 is constructed of elasticized substrate 48. Substrate 48 (FIG. 2) comprises a gatherable substrate 50, an elastic layer 52, and a gatherable substrate 54. Gatherable substrate 50 defines outer surface 44 (FIG. 1) of training pant 20, and comprises a printing surface 56 and an opposed surface 58 (FIG. 3). The elastic layer 52 can be made of any suitable elastic material, and can be in the form of a flat sheet or layer of elastic material or a plurality of strands, ropes, or the like, of elastic material.

With reference to FIG. 3, elasticized substrate 48 is illustrated in a relaxed, contracted state that forms elevated areas 60 on both gatherable substrates 50, 54, and unelevated areas 62 on both gatherable substrates 50, 54. As earlier described, this type of composite elastic material is constructed by bonding a stretched elastic material to a gatherable material, and then allowing the two materials to contract. In FIG. 3, gatherable substrates 50, 54 are suitably joined or bonded to a stretched or elongated elastic layer 52 at locations corresponding to unelevated areas 62. Thereafter, elasticized substrate 48 can be formed or constructed as an outer cover 42 during the manufacturing process of training pant 20.

The elasticizing of gatherable substrates 50, 54 results in a composite elastic material, such as substrate 48, having cloth-like texture on both outer surfaces thereof. Upon relaxing substrate 48 (FIG. 2), there is a contracting of gatherable substrates 50, 54 that forms the elevated areas 60 and unelevated areas 62 (FIG. 3).

In printing graphics on a contracted composite elastic material, such as elasticized substrate 48 (FIG. 3), a continuously moving supply of elasticized substrate 48 can be provided to a printing apparatus. During this printing process, ink transferred from the printing apparatus to substrate 48 will be laid down or deposited primarily on elevated areas 60 (FIG. 3), with unelevated areas 62 receiving very little, if any, ink thereon, thereby resulting in graphics having low resolution and/or low definition. This is one of the earlier described problems associated with prior art printing apparatus and processes. Others of these problems include misregistration, varying color intensity, varying the shape of the printed pattern, or the like.

Another problem associated with printing a contracted composite elastic material is the necessity of maintaining a constant tension on the composite elastic material while it is continuously moving at high speeds through the printing apparatus. Maintaining a constant tension on a composite elastic material, which is moving at high speeds, is extremely difficult, and can result in varying tensions on the material as it moves through the printing apparatus, thereby producing graphics that are blurred and/or have incorrect dimensions.

The present invention provides solutions to these problems, as well as addressing other potential problem areas. One of the features of the present invention is the elimination of blurred or "ghost" graphics that result from printing a contracted composite elastic material. As described above, this results in very little, if any, ink being directly deposited on, for example, the unelevated areas 62 (FIG. 3) of elasticized substrate 48. The elimination of blurred or ghost graphics is accomplished by printing a gatherable substrate, such as substrate 50 (FIG. 3), in a relaxed, uncontracted state prior to its incorporation into a composite elastic material, such as elasticized substrate 48. Since gatherable substrate 50 is printed in a relaxed, uncontracted state, there are no elevated or unelevated areas identical to areas 60, 62 of elasticized substrate 48 that result in blurred or ghost graphics. Thus, the present invention provides high resolution and/or high definition graphics by substantially eliminating unprinted or partially-printed void areas, such as unelevated areas 62. In addition, the use of less ink in printing semi-tone graphics by the present invention substantially reduces ink strikethrough on, particularly, low basis weight substrates, thereby substantially eliminating ink buildup on the printing apparatus.

Now, if the graphics, such as graphics 46 (FIG. 1), printed on printing surface 56 are dimensionally correct, the upon contracting gatherable substrate 50 during the manufacturing of elasticized substrate 48, the printed graphics will be compressed or distorted in size and shape. It is in relation to this situation that another feature of the present invention provides graphics that are printed elongated and/or compressed, relative to the desired end graphic in the finished product.

Throughout this description, the term "elongated" refers to a material that has been changed in length due to stretching or the like, and is expressed in units of length. The term "elongate" refers to a material that has been elongated. The term "elongation" refers to the ratio of (i) the length a material that has been elongated to (ii) the original length of that material prior to its being elongated, and is expressed in percent according to the following formula:

$$\frac{\text{Elongated length} - \text{Original length}}{\text{Original length}} \times 100\%.$$

The terms "elongate" and "elongated" will also be used in this description with reference to graphics 46, and will mean that the graphics 46 are printed, or that the ink is deposited, in an elongated manner compared to the desired end graphic in the finished product. This is accomplished by providing, for example, the printing cylinders with engraved print surfaces that have been elongated relative to the desired end graphic.

By printing only the gatherable substrate 50, the present invention advantageously dispenses with the requirement of having to maintain a constant tension on a composite elastic material being printed. Since gatherable substrate 50 is generally non-elastic, there is a relatively virtual absence of blurred or dimensionally incorrect graphics.

The present invention utilizes a printing process that prints elongate, semi-tone graphics on a substrate, such as gatherable substrate 50. When the printed substrate is incorporated into a composite elastic material, such as elasticized substrate 48, the contracting of the substrate causes the elongate, semi-tone graphics to contract, thereby providing the visual perception of full-tone graphics. The term "full-tone graphic" refers to a graphic that has been printed with a predetermined amount of ink that results in the desired definition, resolution, tone, color intensity, or the like. The term "semi-tone graphic" refers to a graphic that has been printed with an amount of ink less than a predetermined amount of ink required for a full-tone graphic.

Figure 4:
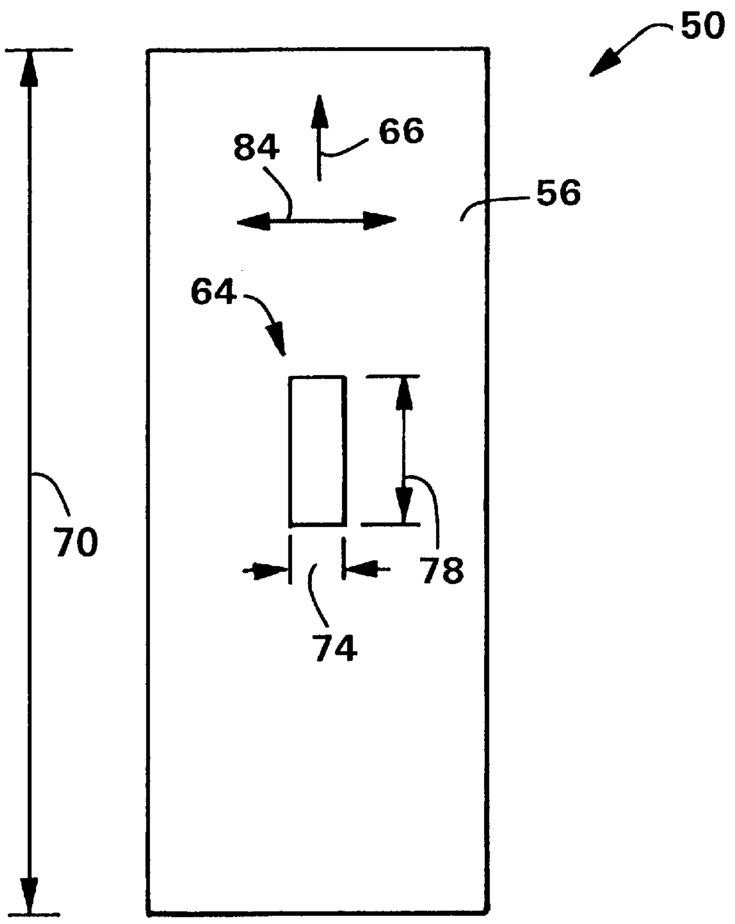
FIG. 4 illustrates a substrate having a graphic printed thereon in accordance with the principles of the present invention.
Figure 5:
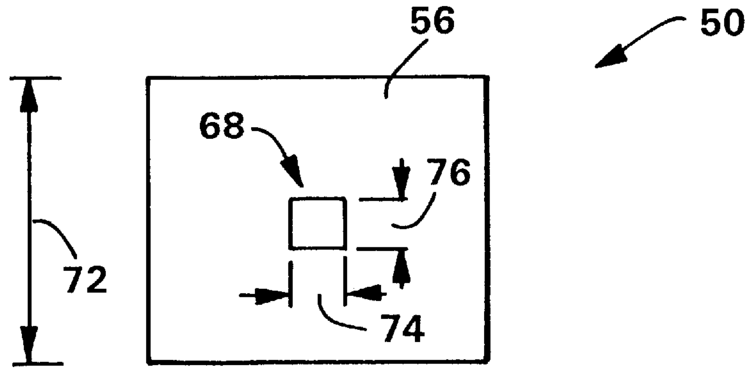
FIG. 5 illustrates the substrate in FIG. 4 in a contracted state.

Referring now to FIG. 4, gatherable substrate 50 is illustrated with a generally rectangular shaped, semi-tone graphic 64 printed thereon. During the printing process, a continuous length of gatherable substrate 50 is continuously moved through the printing apparatus, during which it is printed with semi-tone graphic 64, and although only one graphic 64 is illustrated in FIG. 4, the present invention contemplates that numerous graphics of different sizes and shapes can be printed. With reference to FIG. 4, substrate 50 travels in the machine-direction indicated by arrow 66. The term "machine-direction" is the direction of travel of the continuously moving substrate through the printing apparatus, and in this embodiment it is also the direction in which substrate 50 will be contracted when incorporated into a composite elastic material, as described hereafter. When incorporated with elastic layer 52 (FIG. 2) 48 is allowed to relax, thereby contracting gatherable substrates 50, 54, as illustrated in FIG. 3. A plan or top view of a printed, elasticized substrate 48 appears as illustrated in FIG. 5, with printing surface 56 facing the viewer. As can be seen in FIG. 5, the originally printed graphic 64 has contracted or compressed to provide a visual perception of a full-tone graphic 68. Because semi-tone graphic 64 in FIG. 4 has been contracted or compressed, its generally rectangular form of FIG. 4 has assumed the desired generally square form of FIG. 5.

Thus, the contraction of substrate 50 has both changed the geometric form of the originally printed graphic 64, and has provided the desired color intensity, tone, resolution, definition, and the like. Once substrate 50, in FIG. 4, has been printed in its relaxed, uncontracted state, upon being contracted, it forms a plurality of elevated areas 60 (FIG. 3) and unelevated areas 62. In contrast to the earlier described method of printing elasticized substrate 48 resulting in unelevated areas 62 having very little, if any, ink deposited thereon, the present invention directly prints on the portions of gatherable substrate 50 that will become, upon contraction, the unelevated areas 62. Thus, as viewed in FIG. 3, both elevated areas 60 and unelevated areas 62 have been directly printed with ink, thereby substantially eliminating unprinted void areas associated with the earlier described prior printing process.

Printing with elongate, semi-tone graphics, as described above, generally necessitates a knowledge of the final geometry of the desired end graphic. With a knowledge of that geometry, the dimensions of the semi-tone graphic 64 can be calculated. For example, assume that gatherable substrate 50 in FIG. 4, has an initial uncontracted length 70 (FIG. 4) and a final contracted length 72 (FIG. 5). Final contracted length 72 is dependent upon the amount of elasticity desired in the printed, elasticized substrate 48 (FIG. 3). From this known, or desired, elasticity, the final contracted length 72 can be determined. Also known are the dimensions of the full-tone graphic 68 desired in the end product, e.g., training pant 20.

FIG. 5 illustrates full-tone graphic 68 having a width indicated by arrow 74 and a final length indicated by arrow 76. The unknown factor to be determined is the printed graphic length illustrated by arrow 78 in FIG. 4. Once the printed graphic length 78 is known, substrate 50 can then be printed with elongate, semi-tone graphics 64. The formula for determining printed graphic length 78 is as follows:

If, Initial Uncontracted Length 70=X,
Final Contracted Length 72=Y,
Final Graphic Length 76=b, and
Printed Graphic Length 78=$b_1$,
then, $b_1=(X/Y)$ (b).

Because substrate 50 illustrated in FIGS. 4 and 5 contracts only in the machine-direction 66, there is no need to adjust the printed graphic width from the final graphic width 74, i.e., they remain generally the same width when substrate 50 is contracted or extended.

Once printed graphic length 78 has been determined, and the printing apparatus has been designed and supplied to print the appropriate elongated graphic, then a continuous gatherable substrate 50 can be continuously printed with a plurality of the same or different kinds of elongate, semi-tone graphics. Thereafter, a discrete length of gatherable substrate 50 can be incorporated with elastic layer 52 (FIGS. 2 and 3), which has a known elasticity, and with gatherable substrate 54, to form a printed, elasticized substrate 48 having a desired elasticity and, when in a relaxed, contracted state, will provide the desired color graphics.

Another formula for determining printed graphic length 78 is the following:

$$\left(\frac{\text{Desired Elasticity}}{100}\right)+1.$$

In this formula, the available, or desired, elasticity of the final elasticized substrate, which in one example can be outer cover 42 (FIG. 1) of training pant 20, is divided by 100, and then one is added thereto, thereby resulting in the multiplication factor needed to determine the printed graphic length 78. For example, if it is desired that outer cover 42 have an elasticity of 200 percent, then the formula would be: 200/100+1=2.

The final graphic length 76 (FIG. 5) is then multiplied by this multiplication factor of 2 to calculate printed graphic length 78 (FIG. 4).

Although the example described above involved a rectangle printed as the elongate graphic, these same principles and formulas apply to other geometric forms.

Earlier, with reference to FIGS. 2 and 3, gatherable substrates 50, 54 were described as being bonded to elongated elastic layer 52. After bonding these three elements together, and upon relaxing elastic layer 52, gatherable substrates 50, 54 gather or contract to form elasticized substrate 48. Other processes also are available for forming a composite elastic material, such as elasticized substrate 48. For example, the elastic layer 52 can be made of a heat-shrinkable material, and therefore it would not be elongated prior to bonding gatherable substrates 50, 54 thereto. Instead, the substrates 50, 54 can be bonded to a heat-shrinkable elastic layer 52 in its normal, relaxed state. After bonding these elements together, heat shrinkable elastic layer 52 can be treated with heat in order to make all of it, or only selected portions thereof, elastic. Other materials can also be similarly used in which their elastic characteristics are created or generated by mechanical treating, chemical treating, or the like.

As described in FIGS. 4 and 5, printed elasticized substrate 48 is manufactured to stretch in the machine direction 66 (FIG. 4). However, there are some constructions of an article, such as training pant 20 in FIG. 1, that may prefer having an elasticity in a direction generally transverse to machine direction 66; this direction is termed the cross-direction as indicated by arrow 84 (FIG. 4). Printing on a gatherable substrate 50 that is to have elasticity in the cross-direction 84 requires a different elongate, semi-tone printing technique.

Figure 6:
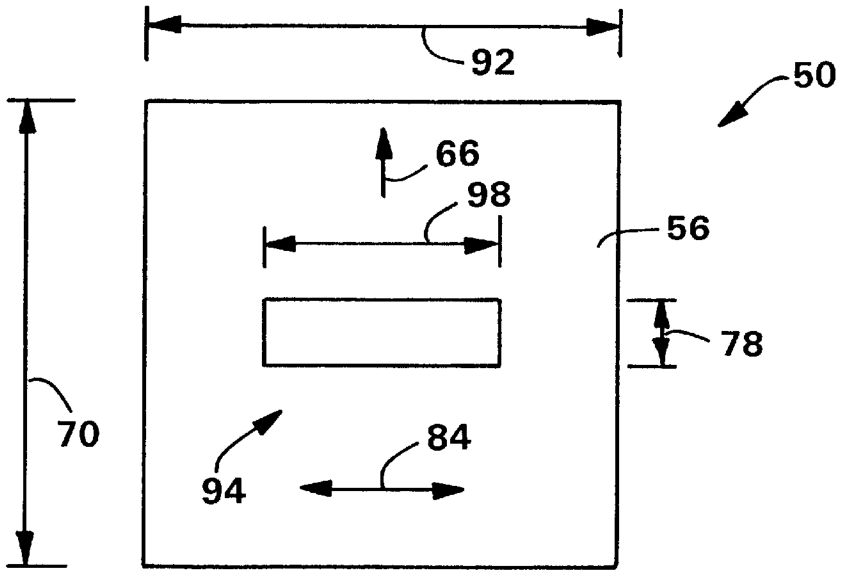
FIG. 6 illustrates another substrate having a graphic printed thereon in accordance with the principles of the present invention.
Figure 7:
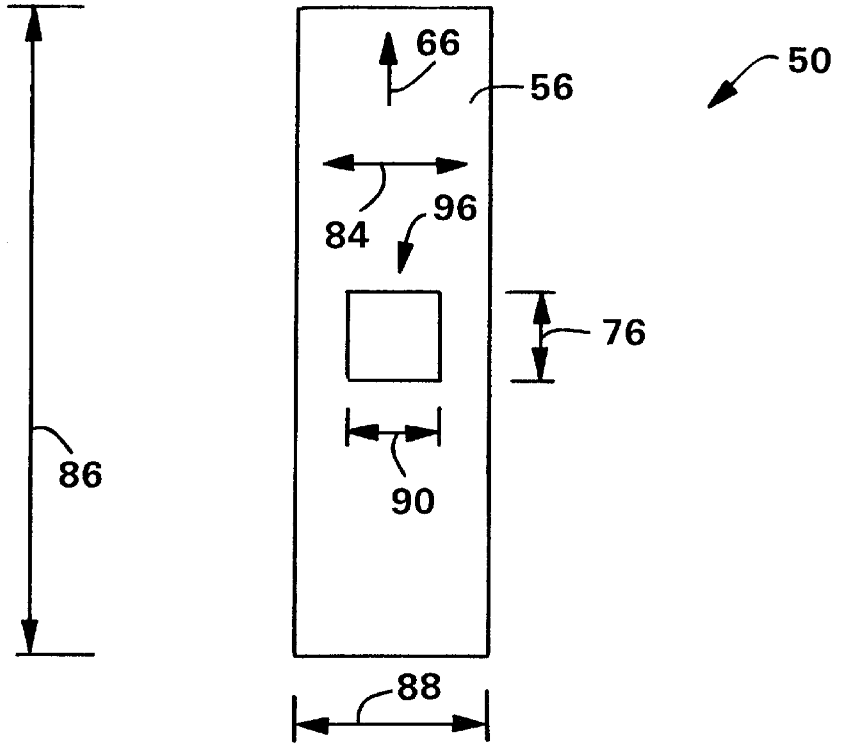
FIG. 7 illustrates the substrate in FIG. 6 in an elongated state.

With reference now to FIGS. 6 and 7, one process of manufacturing a composite elastic material having cross-directional stretch is to elongate the gatherable substrates prior to bonding them to the relaxed elastomeric layer. In this process, it is the elastic layer that remains relaxed, and the gatherable layers that are stretched in the machine-direction 66 (FIG. 7).

There is a difference in printing a graphic on a substrate that is to have cross-directional stretch, as illustrated in FIGS. 6 and 7, and a substrate that is to have machine-direction stretch, as illustrated in FIGS. 4 and 5. Substrate 50 in FIG. 6 is in its relaxed, uncontracted state. In FIG. 7, printed substrate 50 has been elongated in the machine-direction 66 prior to its bonding to a relaxed elastic layer. When comparing substrate 50 in FIGS. 6 and 7, it can be seen that it undergoes two changes in dimension, i.e., its length is increased and its width decreased. Because substrate 50 in FIGS. 6 and 7 experiences a change in both the length and width directions, there are two multiplication factors that need to be calculated prior to printing.

Once again, the elasticity desired in the finished product, such as outer cover 42 of training pant 20 in FIG. 1, generally will be a known parameter, as is the elongated final length, illustrated by arrow 86 (FIG. 7) of substrate 50 and the contracted final width, as illustrated by arrow 88. Two other known parameters are the final graphic length 76 (FIG. 7), and the final graphic width 90. With these known parameters, the two multiplication factors necessary for printing elongate, semi-tone graphic 94 (FIG. 6) can be calculated.

FIG. 6 illustrates graphic 94 printed on substrate 50, in which graphic 94 has a printed graphic length 78 and a printed graphic width 98. The two multiplication factors are calculated from the following two formulas:

If, Initial Uncontracted Width 92=C,
Contracted Final Width 88=D,
Final Graphic Width 90=a, and
Printed Graphic Width 98=$a_1$,
then, $a_1=(C/D)$ (a).

If, Initial uncontracted length 70=X,
Elongated Final Length 86=Y,
Final Graphic Length 76=b, and
Printed Graphic Length 78=$b_1$,
then, $b_1=(X/Y)$ (b).

With the above, semi-tone graphic 94 can be printed on relaxed, uncontracted substrate 50. Thereafter, substrate 50 is elongated in the machine-direction 66, as illustrated in FIG. 7, prior to its bonding to a relaxed elastic layer, such as elastic layer 52 (FIG. 3). As illustrated in FIG. 7, when substrate 50 has been elongated, graphic 94 is formed into a full-tone graphic 96.

As described with reference to FIGS. 6 and 7, a continuously moving substrate 50, in its relaxed, uncontracted state, can be printed with elongate, semi-tone graphics 94 using an amount of ink that will ultimately result in the desired full-tone graphic 96 (FIG. 7). After substrate 50 has been printed, it is elongated in the machine-direction 66, either as part of the printing process or as a subsequent handling process, and then suitably bonded to a relaxed elastic layer 52. Once bonded to elastic layer 52, substrate 50 is maintained in its contracted state by elastic layer 52, thereby resulting in a composite elastic material having cross-directional elasticity.

Figure 8:
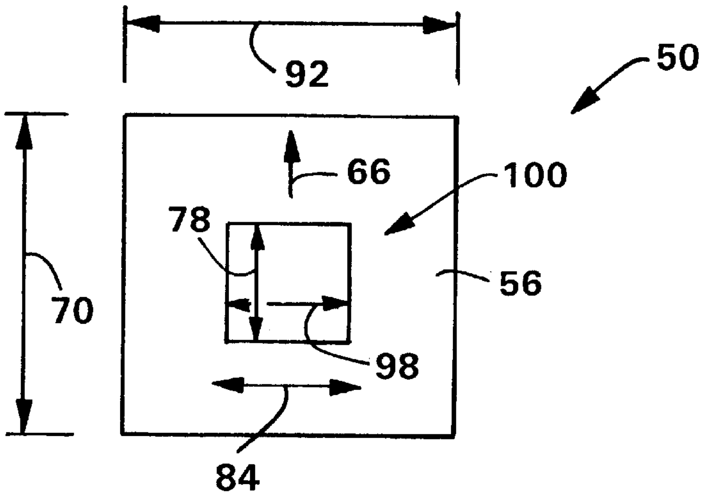
FIG. 8 illustrates yet another substrate having a graphic printed thereon in accordance with the principles of the present invention.
Figure 9:
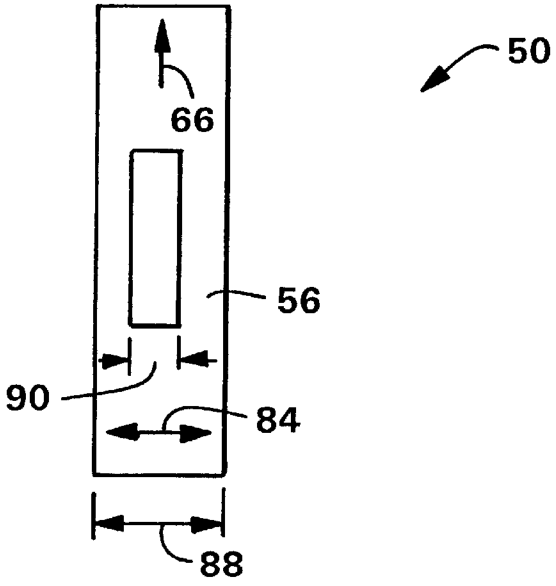
FIG. 9 illustrates the substrate in FIG. 8 in an elongated state.
Figure 10:
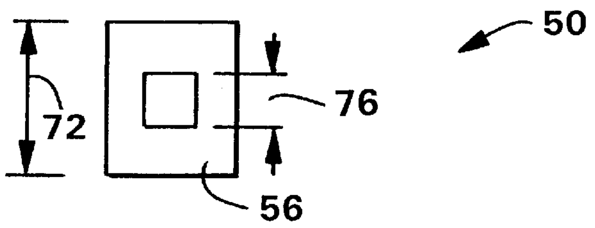
FIG. 10 illustrates the substrate in FIG. 9 in a contracted state.

To this point, the description of printing the substrate 50 with reference to FIGS. 4 and 5 is in relation to a composite elastic material that will stretch only in the machine-direction 66, while the description of substrate 50 with reference to FIGS. 6 and 7 relates to a composite elastic material that will stretch only in the cross-direction 84. In some applications, it is desired that the composite elastic material be multi-directional such that it has elasticity in, for example, both the machine-direction 66 and the cross-direction 84. FIGS. 8–10 illustrate the printing technique for this type of multi-directional composite elastic material. FIG. 8 illustrates substrate 50 in its relaxed, uncontracted state with a semi-tone graphic 100 printed thereon. FIG. 9 illustrates substrate 50 after it has been elongated in the machine-direction 66. Once elongated in the machine-direction 66, substrate 50 is bonded to an elongated elastic layer and, upon relaxing the elongated elastic layer, substrate 50 is contracted in machine-direction 66, as illustrated in FIG. 10. Thus, substrate 50 in FIG. 10 has elasticity in both the machine-direction 66 and the cross-direction 84.

The two formulas for determining the printed graphic width 98 (FIG. 8) and the printed graphic length 78 are as follows:

If, Initial Uncontracted Width 92=C,
Contracted Final Width 88=D,
Final Graphic Width 90=a, and
Printed Graphic Width 98=$a_1$,
then, $a_1$=(C/D) (a).
If, Initial Uncontracted Length 70=X,
Final Contracted Length 72=Y,
Final Graphic Length 76=b, and
Printed Graphic Length 78=$b_1$,
then, $b_1$=(X/Y) (b).

When a low basis weight substrate is printed with the requisite amount of ink to form a desired full-tone graphic, portions of the ink can pass therethrough and become deposited on the surface of the printing apparatus. This is termed "strikethrough" and causes ink buildup on the printing apparatus. A material is "low basis weight" when it has an inherent propensity for ink strikethrough. This propensity can derive from a large number of small voids in the material, or a smaller number of larger voids. A nonwoven substrate, for example, can be considered low basis weight when its basis weight is equal to or less than about 20 grams per square meter.

This ink strikethrough and ink buildup result in poor print quality on the substrate, the transfer of ink to the back surface of the substrate, and poor operating efficiency due to machinery downtime required to remove the ink buildup. Moreover, ink strikethrough can also cause undesirable graphic effects on the substrate such as the smearing of colors, blurring of the pattern, misregistration, or the like. These undesirable effects are not pleasing to the consumer, and tend to cause a perception of poor product quality and performance.

This problem has been substantially eliminated by the present invention in using a lesser amount of ink to print a semi-tone graphic. Because a lesser amount of ink is used, ink strikethrough can be substantially reduced.

As described, the present invention provides an elongate, semi-tone printing process that substantially reduces ink strikethrough, and thus ink buildup on the printing apparatus, while still providing clear, vivid graphics resulting from printed semi-tone graphics contracting to full-tone graphics.

While this invention has been described as having a preferred embodiment, it will be understood that it is capable of further modifications. This application is therefore intended to cover any variations, equivalents, uses, or adaptations of the invention following the general principles thereof, and including such departures from the present disclosure as come or may come within known or customary practice in the art to which this invention pertains and fall within the limits of the appended claims.

What is claimed is:

1. A process for providing a printed elasticized substrate, comprising the steps of:

continuously moving a substrate having a printing surface, printing a semi-tone graphic with an amount of ink less than the amount of ink for a full-tone graphic on the printing surface of the substrate, elasticizing the substrate after it has been printed, and contracting the substrate to provide the full-tone graphic.

2. The process of claim 1 wherein elasticizing includes treating the substrate to make it elastic.

3. The process of claim 1 wherein elasticizing includes bonding the substrate to an elastic layer.

4. The process of claim 3 wherein the elastic layer is a sheet of elastic material.

5. The process of claim 3 wherein the elastic layer is a plurality of strands of elastic material.

6. The process of claim 1 further comprising incorporating the printed elasticized substrate into an article.

7. The process of claim 1 wherein the printing is flexographic printing.

8. The process of claim 1 wherein the printing is rotogravure printing.

9. The process of claim 1 wherein the printing is ink-jet printing.

10. The process of claim 1 wherein the substrate has a basis weight equal to or less than about 20 grams per square meter.

* * * * *

UNITED STATES PATENT AND TRADEMARK OFFICE
CERTIFICATE OF CORRECTION

PATENT NO. : 6,231,715 B1
DATED : May 15, 2001
INVENTOR(S) : Schleinz et al.

It is certified that error appears in the above-identified patent and that said Letters Patent is hereby corrected as shown below:

Title page,
Item [56], delete "4,069,522" and substitute -- 4,069,822 --.

Column 6,
Line 29, after "(FIG. 2)" insert -- and gatherable substrate 54 to form elasticized substrate 48, substrate --.

Signed and Sealed this

Fourteenth Day of May, 2002

*Attest:*

JAMES E. ROGAN
*Director of the United States Patent and Trademark Office*

*Attesting Officer*